(12) United States Patent
Lindsay et al.

(10) Patent No.: US 8,391,938 B2
(45) Date of Patent: Mar. 5, 2013

(54) TRANSPORTABLE RAPID DEPLOYMENT SUPERCONDUCTING TRANSFORMER

(75) Inventors: David Timothy Lindsay, Charlotte, NC (US); Steve Eckroad, Charlotte, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 13/161,181

(22) Filed: Jun. 15, 2011

(65) Prior Publication Data

US 2012/0322664 A1 Dec. 20, 2012

(51) Int. Cl.
*H01L 39/24* (2006.01)
(52) U.S. Cl. ........................................ 505/211
(58) Field of Classification Search ................ 505/211; 323/360
See application file for complete search history.

(56) References Cited

U.S. PATENT DOCUMENTS

| | | | | |
|---|---|---|---|---|
| 3,602,726 A * | 8/1971 | Toedtman | ...... | 307/95 |
| 4,812,262 A * | 3/1989 | Shinzawa et al. | ...... | 252/567 |
| 4,894,556 A * | 1/1990 | Hilal et al. | ...... | 307/106 |
| 6,726,857 B2 * | 4/2004 | Goedde et al. | ...... | 252/570 |
| 6,995,646 B1 * | 2/2006 | Fromm et al. | ...... | 336/206 |
| 7,073,340 B2 * | 7/2006 | Pleva | ...... | 62/50.6 |
| 2002/0063487 A1 * | 5/2002 | Leijon | ...... | 310/179 |
| 2004/0184292 A1 * | 9/2004 | Knox | ...... | 363/58 |
| 2007/0152789 A1 * | 7/2007 | Watanabe et al. | ...... | 335/216 |
| 2010/0085137 A1 * | 4/2010 | Baker et al. | ...... | 335/216 |
| 2011/0043312 A1 * | 2/2011 | Yang | ...... | 336/90 |
| 2011/0183853 A1 * | 7/2011 | Thom et al. | ...... | 505/210 |
| 2011/0301880 A1 * | 12/2011 | Stenestam | ...... | 702/50 |

* cited by examiner

*Primary Examiner* — Colleen Dunn
(74) *Attorney, Agent, or Firm* — Curatolo Sidoti Co., LPA; Joseph G. Curatolo; Salvatore A. Sidoti

(57) ABSTRACT

A transformer including: a transformer housing having an interior, a superconducting wire winding disposed within the housing interior, a dry dielectric medium in contact with a superconducting wire winding, and a temperature control device in heat exchange communication with the dry dielectric medium, adapted to utilize a gaseous medium for controlling the temperature of the superconducting wire winding.

21 Claims, 2 Drawing Sheets

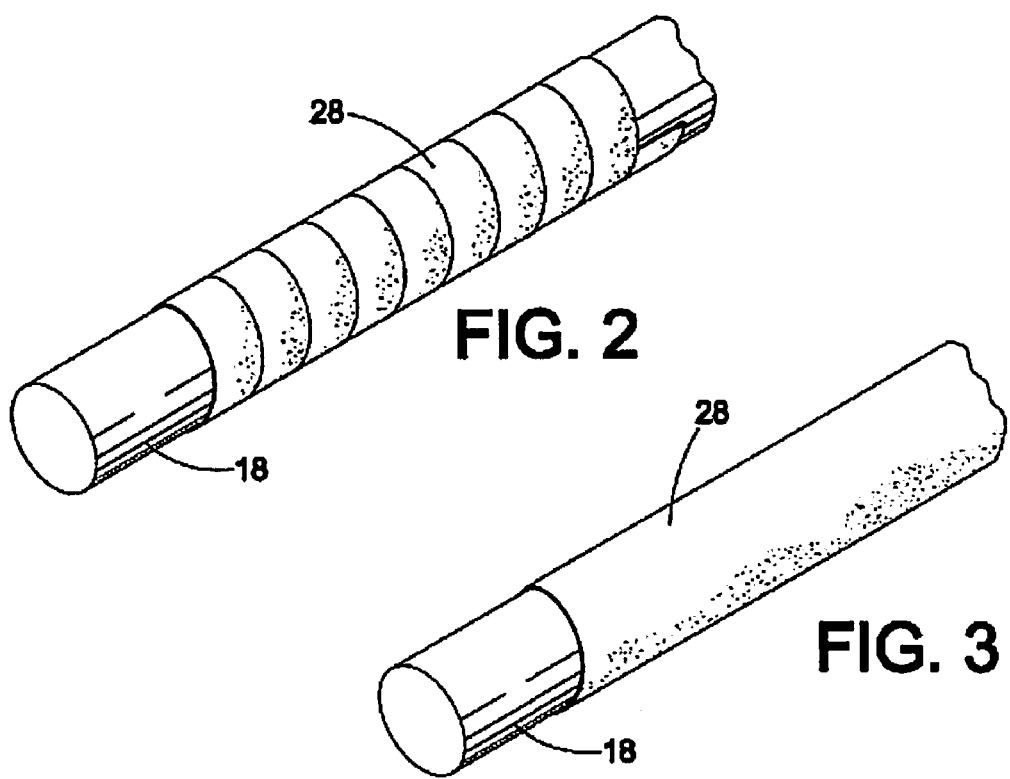

TRANSPORTABLE RAPID DEPLOYMENT SUPERCONDUCTING TRANSFORMER

Power transformers are devices used to adjust or transform the voltage of a power supply at various points along the power supply's transmission route. Traditionally, oil-filled transformers utilize a housing that contains a copper wire winding surrounded by a wet dielectric medium, such as paper saturated with oil. As the temperature of the wire winding increases due to the normal operation associated with transforming voltage, the wet dielectric medium transfers heat away from the wire winding and thus cools the wire winding.

A problem with oil-filled transformers made with standard copper wire windings is that the transformer itself is physically large. The copper wire used in the copper wire windings in an oil-filled transformer may be up to several square millimeters in cross-sectional area. As the wire winding may comprise several hundred meters of copper wire, the physical size and weight of the wire winding requires physically large complementary components.

For these reasons, transportation of traditional copper wire transformers is difficult and costly. Also, as the oil-filled transformers must be sealed for optimal performance, the oil is not introduced before shipping, and must be added at the use point during final assembly. By adding the oil after shipping, the transformer weight is reduced, helping but not curing the problems associated with shipping a large heavy piece of equipment. Further, as oil-filled transformers are so large, heavy, and difficult to fabricate, most manufacturers do not maintain large inventories of conventional oil-filled transformers. Therefore, finding and shipping conventional oil-filled transformers is difficult, costly, and time consuming.

A transformer utilizing a superconducting wire winding may be much smaller than a comparable oil-filled transformer. Superconducting wires may be only a fraction of the diameter of a traditional wire, but hold greater conducting properties and transmission than a larger traditional wire. Thus, a smaller superconducting transformer may transform as much power as a larger, traditional oil-filled transformer. However, conventional superconducting transformers use liquid nitrogen to achieve the low temperatures required for proper operation. Additional special equipment is needed to supply the liquid nitrogen, which further adds to the weight and size of a transformer, thus resulting in shipping problems similar to those associated with oil-filled transformers.

As there is a low inventory of conventional oil-filled transformers, and many shipping problems associated with oil-filled transformers and superconducting transformers utilizing liquid nitrogen, rapidly deployable emergency replacement units are difficult to find.

What is needed is a transformer that is easily shipped and stored. Incorporating superconducting wire windings helps decrease transformer size, and increases transformer capability. However, additional transformer size reductions may be possible by simplifying the equipment associated with a superconducting transformer.

FIG. 2 shows a partial view of an illustrative embodiment of the superconducting wire of the winding and the dry dielectric medium wrapped around the wire.

FIG. 3 shows a partial view of an illustrative embodiment of the superconducting wire of the winding and the dry dielectric medium formed around the wire.

Figure 1:
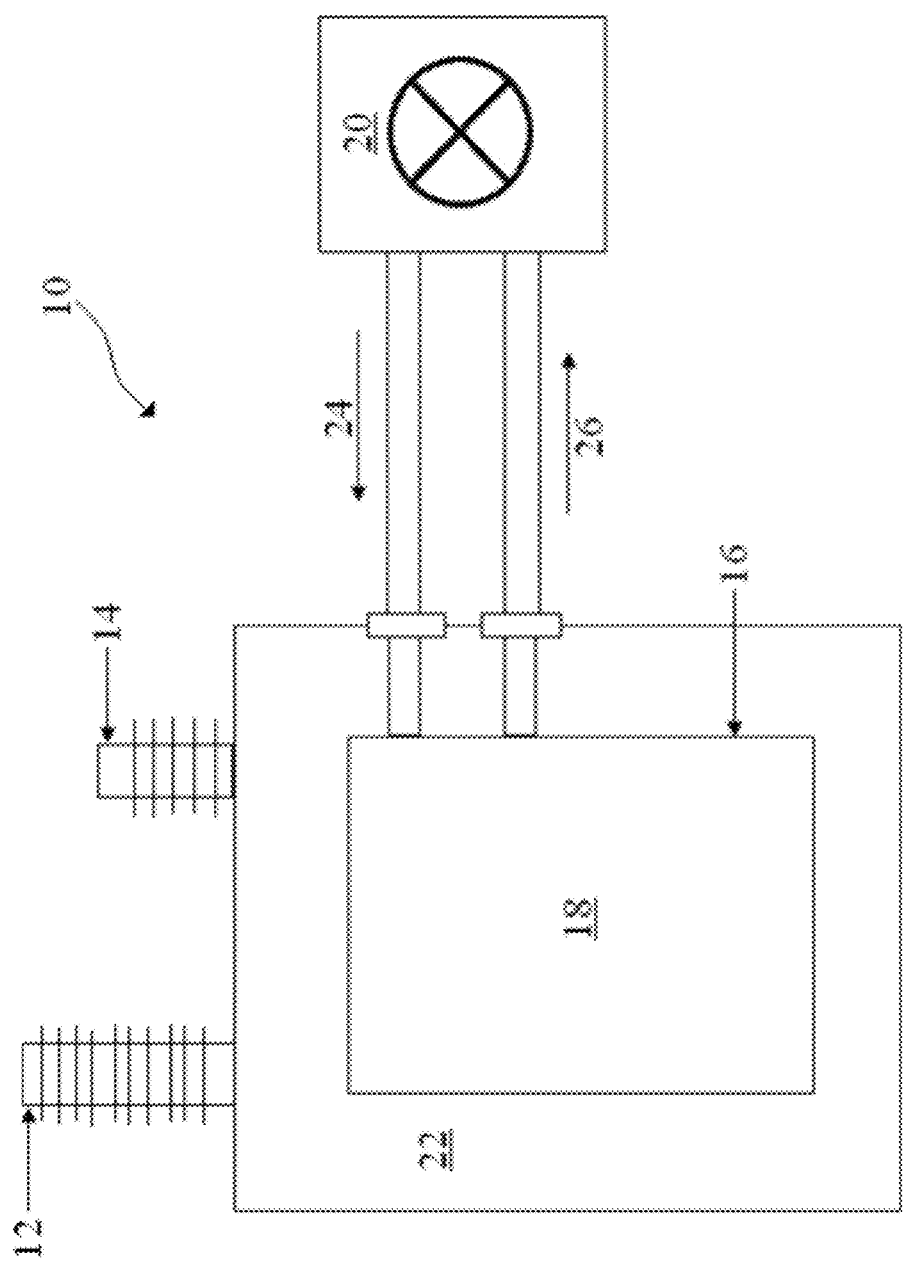
FIG. 1 is a schematic representation of an embodiment of the subject transformer.

Provided is a transformer with a superconducting wire winding and dry dielectric medium. In one embodiment, a transformer is provided which comprises a transformer housing, a superconducting wire winding disposed within the housing, a dry dielectric medium in contact with the superconducting wire winding, and a temperature control device associated with the transformer, wherein the temperature control device utilizes a gaseous medium for controlling the temperature of the superconducting wire winding.

The temperature control device may be engaged with the transformer, such as being in physical contact with the exterior of the transformer. Alternatively, the temperature control device may be a separate unit that remains attached to the transformer via insulated hose connections to convey a cold, gaseous cryogen between the temperature control device and the transformer. A separate temperature control device may be desirable to reduce size and weight of individual components for shipping/transport.

The transformer housing functions as a vessel to contain the components associated with the superconducting wire winding. The transformer housing isolates the transformer components from the housing's exterior environment. By isolating the dry dielectric medium, superconducting wire winding, and gas medium from the transformer housing's exterior environment, the superconducting capabilities of the transformer are maintained. Further, the transformer housing comprises conventional shielding to prevent electrostatic and magnetic interference.

The superconducting wire winding functions much in the same way as a traditional wire winding. However, a superconducting wire used in the superconducting wire winding is much thinner, shorter in length, generally smaller, and weighs only a fraction of a traditional oil-filled transformer wire winding, which uses a much thicker traditional wire. Superconducting wires are generally flat tapes, but may be available in round wire form. Flat tape superconducting wire may be about 4 mm to about 10 mm wide, with a thickness of about 0.1 mm to about 0.4 mm. A round superconducting wire may be about 1 mm to about 3 mm in diameter. Conversely, the copper wire used in traditional power transformers are typically about 6 mm to about 18 mm wide, with a thickness of about 2 mm to about 4 mm. A superconducting wire may be only fractions of a square millimeter in cross-sectional area, but can transmit the same power as a traditional wire which may be several square millimeters in cross-sectional area. Therefore, a transformer utilizing a superconducting wire for the winding may transmit the same power as a traditional oil-filled transformer utilizing traditional wire while remaining much smaller in size.

The dry dielectric medium absorbs heat generated by the superconducting wire winding as current passes through the superconducting wire winding and conducts such heat to the gaseous cryogenic cooling medium. If the superconducting wire winding was allowed to reach or exceed its critical temperature, its superconducting capabilities would be diminished or lost. Below the critical temperature of a superconducting material, the superconducting material transmits increased voltage with little or no resistance as compared to non-superconducting materials. Therefore, maintaining a superconducting wire winding temperature below the critical temperature is desirable. The dry dielectric medium may contact or be disposed in close proximity to the superconducting wire winding. Where the dry dielectric medium contacts the superconducting wire windings, it may provide physical support for the superconducting wire winding. The dry dielectric medium can absorb the heat generated by the superconducting wire winding, such that the temperature of the superconducting wire winding may be maintained below the critical temperature. Further, the dry dielectric medium electrically insulates the superconducting wire windings inside the housing, and provides other dielectric requirements. In certain embodiments, the dry dielectric medium is formed or wrapped around the superconductor wire winding.

As the dry dielectric medium removes heat generated by the superconducting wire winding, control is needed to maintain proper process temperature by evacuating the heat from the transformer housing. The temperature control device associated with the transformer may continuously or intermittently inject cool gas to absorb heat from the dry dielectric medium and superconducting wire winding. As the temperatures of the superconducting wire winding and the dry dielectric medium rise, the temperature control device may continue to allow cool gas to enter the transformer housing. The dry dielectric medium and superconducting wire winding will then transfer heat to the cool gas as the system moves toward equilibrium. The dry dielectric medium may or may not be penetrated by the cool gas. As the gas increases in temperature due to the transfer of heat from the dry dielectric medium and superconducting wire winding, the temperature control device may continuously or intermittently evacuate the heated gas out of the transformer housing so that cooler gas may enter the housing and continue the cycle. Through the operation of the temperature control device, a median control temperature of the superconducting wire winding is maintained between about 4 K (−269° C.) to about 195 K (−72.2° C.), in certain embodiments, between about 4 K (−269° C.) to about 70 K (−203° C.).

The temperature control device may comprise a make-up gas storage reservoir, compressor, heat exchanger, circulation pump, temperature sensors such as thermocouples or diodes, pressure sensors, and a computer/controller. The temperature sensors monitor the temperature within the transformer housing. When the computer/controller determines that the transformer temperature is rising through an interface with the temperature sensors, the computer/controller allows the circulation pump to operate and starts the cycling of cool gas into the transformer housing, such as through a hose and/or pipe connection. The computer/controller may continuously read process temperature data and allow the temperature control device to continuously or intermittently cycle gas through the transformer in order to maintain superconducting temperatures. Heated gas leaving the transformer housing may be returned to the make-up gas storage reservoir, where it is cooled to recycle through the transformer housing.

In certain embodiments, the temperature control device may include a refrigeration cycle, heat exchanger and circulation pump to force gas to flow through the temperature control device and the transformer. In these embodiments, the temperature control device and transformer form a closed-loop system such that, as gas warms up inside the transformer, it is circulated out of the transformer, through the heat exchanger, where it is recooled by the refrigeration cycle, and back into the transformer. Temperature sensors are provided to detect the temperature of the flowing gas as well as the temperature inside the transformer. A computer/controller utilizes input from the temperature sensors to adjust the cooling power of the temperature control device according to a desired temperature within the transformer and/or a desired temperature of the superconductor wire winding. A desired temperature of the superconducting wire winding may be from about 4 K (−269° C.) to about 195 K (−72.2° C.), in certain embodiments, from about 4 K (−269° C.) to about 70 K (−203° C.)

Heat may also be absorbed through the exterior housing of the transformer. In certain embodiments, thermal insulation may be present on the exterior of the transformer. The thermal insulation may comprise a vacuum sealed, multiple-layer insulation system. Regardless of whether there is insulation present on the exterior of the transformer, heat will be absorbed by the housing from the external environment, and this heat will have to be removed by the temperature control device.

The median control temperature refers to the temperature of the superconducting wire winding under normal operating conditions. As the transformer operates, the temperature inside the housing fluctuates relative to a power passing through the superconducting wire winding. The median control temperature of the superconducting wire winding is the target operating temperature that the temperature control device maintains, while accounting for some temperature variation due to normal operation.

In certain embodiments, the superconducting wire winding comprises an alloy comprising at least two of copper, bismuth, strontium, yttrium, niobium, titanium, tin, magnesium, or boron.

In certain embodiments, the superconducting wire winding may comprise a so-called low or high temperature superconductor, such as Bismuth Strontium Calcium Copper Oxide (BSCCO), Yttrium Barium Copper Oxide (YBCO), Niobium Titanium (NbTi), Magnesium Diboride ($MgB_2$), or Niobium Tin ($Nb_3Sn$). Niobium Titanium (NbTi) and Niobium Tin ($Nb_3Sn$) are considered low temperature superconductor materials. Magnesium Diboride ($MgB_2$) is also a low temperature superconductor, but maintains superconducting properties at temperatures higher than Niobium Titanium (NbTi) and Niobium Tin ($Nb_3Sn$). Bismuth Strontium Calcium Copper Oxide (BSCCO) and Yttrium Barium Copper Oxide (YBCO) are superconducting materials which maintain superconducting properties at higher temperatures than Magnesium Diboride ($MgB_2$), and may be cooled with liquid nitrogen, a relatively inexpensive cryogen.

In certain embodiments, the temperature control device maintains the median control temperature of the superconducting wire winding below the critical temperature of the superconducting wire winding. The temperature control device may continuously cycle warm gas out of the transformer housing, and cool gas into the transformer housing. The gas cycling may operate continuously while the transformer is in operation.

In certain embodiments, the median control temperature of the superconducting wire winding is maintained at from about 4 K (−269° C.) to about 195 K (−72.2° C.), in certain embodiments, from about 4 K (−269° C.) to about 70 K (−203° C.).

In certain embodiments, the dry dielectric medium comprises at least one of epoxy, fiber reinforced plastic, silicone rubber, or ethylene-propylene rubber. Optionally, the dry dielectric medium may be filled. The filler material may comprise at least one of alumina ($Al_2O_3$), silica ($SiO_2$), or titanium dioxide ($TiO_2$).

In certain embodiments, the dry dielectric medium comprises at least one of solid, cast, molded, extruded or machined materials, or impregnated laminar material, such as but not limited to paper. The impregnated laminar material may be impregnated or penetrated by the cool gas.

In certain embodiments, heat is removed from the dry dielectric medium without reliance on a cryogenic liquid. In other embodiments, cryogenic liquids may be used to reduce the temperature of the superconducting wire winding below its critical temperature. However, cryogenic liquids may saturate the dry dielectric medium and potentially alter the dry dielectric medium properties, while also increasing the transformer weight. Alternatively, low temperature gas, such as a gaseous cryogen, may be used to shield and cool the dry dielectric medium. This prevents saturation of the dry dielectric medium while adding less weight to the transformer than a system requiring cryogenic liquids.

The use of a gaseous medium rather than a cryogenic liquid reduces the equipment demand on the transformer. In order to supply cryogenic liquid, special equipment is required. Such special equipment may comprise: a vacuum insulated cryogenic liquid storage vessel, vacuum insulated cryogenic liquid supply piping, and cryogenic liquid rated fittings. The special equipment is both physically heavy and economically expensive to obtain. Therefore, transformers which utilize cryogenic liquid for a cooling system are larger and more expensive than those which do not utilize cryogenic liquids. Additionally, the cryogenic liquid itself adds significant weight to the transformer. Further, transformers utilizing gaseous media rather than cryogenic liquids do not require cryogenic liquids or the special equipment necessary to maintain the cryogenic liquid state during the shipping process. Therefore, transformers utilizing gaseous media are shipped more easily due to reduced equipment demand and reduced weight. Transformers utilizing gaseous media may be shipped in a cold state, without the need for mobile refrigeration equipment, and arrive at the destination of use ready for use.

In the subject transformer, wherein a gaseous medium is utilized to maintain temperatures below the critical temperature of the superconducting wire winding, less equipment is required to provide the gaseous cooling medium as opposed to a cryogenic liquid. Due to its simplified equipment requirements, utilizing a gaseous cooling medium allows the subject transformer to be shipped in its cold state, with little additional equipment or weight. Thus, as the transformer is already in a cold state upon arrival at the final use point, the transformer may be commissioned into service faster than a transformer requiring cooling before operation, and may be ready for use upon arrival at the final use point without further manipulation or preparation.

In certain embodiments, the gaseous medium is capable of maintaining the temperature of the superconducting wire winding in a range of from about 4 K (−269° C.) to about 195 K (−72.2° C.), in certain embodiments, from about 4 K (−269° C.) to about 70 K (−203° C.).

In certain embodiments, the gaseous medium is capable of remaining in a gaseous state at temperatures of as low as about 4 K (−269° C.). The present embodiments use a gaseous medium and not a cryogenic liquid. Therefore, it is desired that the gaseous medium remain in a gaseous state below about 195 K (−72.2° C.), in certain embodiments, about 70 K (−203° C.).

In certain embodiments, the gaseous medium comprises at least one of pressurized argon, helium, hydrogen, pressurized nitrogen, neon, methane or carbon dioxide.

In certain embodiments, the transformer housing is vacuum jacketed. The vacuum jacketing, in combination with multi-layer insulation (MLI), provides thermal insulation in order to maintain the proper temperature inside the transformer as well as sealing against ingress of air.

In certain embodiments, the critical temperature of the superconducting wire winding is greater than about 4 K (−269° C.).

In certain embodiments, the transformer housing comprises at least one primary bushing and at least one secondary bushing per phase of the transformer. The primary bushing acts as the input of high voltage power entering the transformer. The secondary bushing serves as the output for the transformed lower voltage.

In certain embodiments, the bushings associated with the transformer housing may be vacuum jacketed, in part to prevent power losses during power transmission.

In certain embodiments, the transformer housing comprises stainless steel.

Referring to FIG. 1, an embodiment of the subject transformer 10 comprises a primary bushing 12, a secondary bushing 14, a housing 16, thermal insulation 22 (such as vacuum jacketing) engaged with the external surface of the housing, a superconductor wire winding 18 disposed within the housing, and a temperature control device 20 engaged with the housing. The superconductor wire winding 18 includes a dry dielectric medium in contact with the superconductor wire winding, such as by the dry dielectric medium surrounding the wire of the superconductor wire winding 18. The temperature control device 20 sends cold gas through conduit 24 into the interior space of the housing 16, such that it may cool the dry dielectric medium and the superconductor wire winding 18. Warm gas passes through conduit 26 to the temperature control device 20, where it is recooled for recycle through conduit 24 into the interior space of the housing 16.

Referring to FIGS. 2 and 3, the subject transformer 10 may comprise at least one of several embodiments wherein the dry dielectric medium 28 is wrapped or formed around the superconducting wire winding 18. FIGS. 2 and 3 do not represent an exhaustive exhibit of embodiments wherein the dry dielectric medium 28 may be wrapped or formed around the superconducting wire winding 18.

In a first embodiment of the present subject matter, a transformer may comprise a transformer housing having an interior; a superconducting wire winding disposed within the housing interior; a dry dielectric medium in contact with the superconducting wire winding; and a temperature control device in heat exchange communication with the dry dielectric medium, adapted to utilize a gaseous medium for controlling the temperature of the superconducting wire winding.

The transformer of the first embodiment may further include that the superconducting wire winding comprises a metal or an alloy comprising at least two of copper, bismuth, strontium, yttrium, niobium, titanium, tin, magnesium, or boron. The superconducting wire winding may comprise Bismuth Strontium Calcium Copper Oxide (BSCCO), Yttrium Barium Copper Oxide (YBCO), Niobium Titanium (NbTi), Magnesium Diboride ($MgB_2$), or Niobium Tin ($Nb_3Sn$).

The transformer of either or both of the first or subsequent embodiments may further include a temperature control device which is adapted to maintain a median control temperature of the superconducting wire winding below the superconducting wire winding critical temperature.

The transformer of any of the first or subsequent embodiments may further include a dry dielectric medium comprising at least one of epoxy, fiber reinforced plastic, silicone rubber, or ethylene-propylene rubber. Optionally, any or all of the epoxy, fiber reinforced plastic, silicone rubber, or ethylene-propylene rubber may be filled. The filler may comprise at least one of alumina ($Al_2O_3$), silica ($SiO_2$), or titanium dioxide ($TiO_2$). The dry dielectric medium may comprise solid, cast, molded, extruded, machined, or impregnated laminar material.

The transformer of any of the first or subsequent embodiments may further include a dry dielectric medium which can absorb the heat generated by the superconducting wire winding, such that the superconducting wire winding temperature may be maintained below the superconducting wire winding critical temperature without contacting a cryogenic liquid.

The transformer of any of the first or subsequent embodiments may further include a gaseous medium capable of absorbing heat generated by the superconducting wire winding and maintaining a median control temperature of the superconducting wire winding in a range of from about 4 K (−269° C.) to about 195 K (−72.2° C.). The gaseous medium may be capable of absorbing heat generated by the superconducting wire winding and maintaining a median control temperature of the superconducting wire winding in a range of from about 4 K (−269° C.) to about 70 K (−203° C.).

The transformer of any of the first or subsequent embodiments may further include a gaseous medium capable of remaining in a gaseous state at a temperature in the range of about 4 K (−269° C.) to about 70 K (−203° C.). The gaseous medium may comprise at least one of pressurized argon, helium, hydrogen, pressurized nitrogen, neon, methane or carbon dioxide.

The transformer of any of the first or subsequent embodiments may further include that the transformer housing is vacuum jacketed.

The transformer of any of the first or subsequent embodiments may further include that the superconducting wire winding has a critical temperature greater than about 4 K (−269° C.), optionally up to about 195 K (−72.2° C.).

The transformer of any of the first or subsequent embodiments may further include that the superconducting wire winding has a critical temperature greater than about 4 K (−269° C.), optionally up to about 70 K (−203° C.).

The transformer of any of the first or subsequent embodiments may further include that the transformer housing comprises at least one primary bushing and at least one secondary bushing per phase of the transformer. The bushing associated with the transformer housing may be pressure sealed against the vacuum jacketed outer housing.

The transformer of any of the first or subsequent embodiments may further include that the transformer housing comprises stainless steel.

The transformer of any of the first or subsequent embodiments may further include that the temperature control device is in heat exchange communication with the transformer via a gas conduit.

The transformer of any of the first or subsequent embodiments may further include that the temperature control device is a separate unit engaged with an exterior of the transformer housing. The temperature control device may be fixedly attached to the exterior of the transformer housing.

While the transformer has been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the transformer should not be limited to any single embodiment, but rather construed in breadth and scope in accordance with the recitation of the appended claims.

The invention claimed is:

1. A transformer comprising:
a transformer housing having an interior;
a superconducting wire winding disposed within the housing interior;
a dry dielectric medium in contact with the superconducting wire winding; and
a temperature control device in heat exchange communication with the dry dielectric medium, adapted to utilize a gaseous medium for controlling the temperature of the superconducting wire winding, wherein the dry dielectric medium is capable of conducting heat generated by the superconducting wire winding to the gaseous medium.

2. The transformer of claim 1, wherein the superconducting wire winding comprises at least two of copper, bismuth, strontium, yttrium, niobium, titanium, tin, magnesium, or boron.

3. The transformer of claim 2, wherein the superconducting wire winding comprises bismuth strontium calcium copper oxide, yttrium barium copper oxide, niobium titanium, magnesium diboride, or niobium tin.

4. The transformer of claim 1, wherein the temperature control device is adapted to maintain a median control temperature of the superconducting wire winding below the superconducting wire winding critical temperature.

5. The transformer of claim 1, wherein the dry dielectric medium comprises at least one of epoxy, fiber reinforced plastic, silicone rubber, or ethylene-propylene rubber, optionally wherein the dry dielectric medium is filled.

6. The transformer of claim 1, wherein the dry dielectric medium comprises at least one of solid, cast, molded, extruded, machined, or impregnated laminar material.

7. The transformer of claim 1, wherein the dry dielectric medium can absorb the heat generated by the superconducting wire winding, such that the superconducting wire winding temperature may be maintained below the superconducting wire winding critical temperature without contacting a cryogenic liquid.

8. The transformer of claim 1, wherein the gaseous medium is capable of maintaining a median temperature of the superconducting wire winding in a range of from about 4 K (−269° C.) to about 195 K (−72.2° C.).

9. The transformer of claim 1, wherein the gaseous medium is capable of maintaining a median temperature of the superconducting wire winding in a range of from about 4 K (−269° C.) to about 70 K (−203° C.).

10. The transformer of claim 1, wherein the gaseous medium is capable of remaining in a gaseous state at a temperature in the range of about 4 K (−269° C.) to about 195 K (−72.2° C.).

11. The transformer of claim 1, wherein the gaseous medium is capable of remaining in a gaseous state at a temperature in the range of about 4 K (−269° C.) to about 70 K (−203° C.).

12. The transformer of claim 10, wherein the gaseous medium comprises at least one of pressurized argon, helium, hydrogen, pressurized nitrogen, neon, methane or carbon dioxide.

13. The transformer of claim 1, wherein the transformer housing is vacuum jacketed.

14. The transformer of claim 1, wherein the critical temperature of the superconducting wire winding is greater than about 4 K (−269° C.), optionally up to about 195 K (−72.2° C.).

15. The transformer of claim 1, wherein the critical temperature of the superconducting wire winding is greater than about 4 K (−269° C.), optionally up to about 70K (−203° C.).

16. The transformer of claim 1, wherein the transformer housing comprises at least one primary bushing and at least one secondary bushing per phase of the transformer.

17. The transformer of claim 16, wherein the bushing associated with the transformer housing is pressure sealed against the vacuum jacketed outer housing.

18. The transformer of claim 1, wherein the transformer housing comprises stainless steel.

19. The transformer of claim 1, wherein the temperature control device is in heat exchange communication with the transformer via a gas conduit.

20. The transformer of claim 1, wherein the temperature control device is a separate unit engaged with an exterior of the transformer housing.

21. The transformer of claim 20, wherein the temperature control device is fixedly attached to the exterior of the transformer housing.

* * * * *